Patented May 2, 1939

2,156,345

UNITED STATES PATENT OFFICE 2,156,345

CONCENTRATION OF ALIPHATIC ACIDS

Herbert E. Martin, Cumberland, Md., assignor to Celanese Corporation of America, a corporation of Delaware No Drawing. Application December 22, 1936, Serial No. 117,151

7 Claims. (Cl. 260—541)

This invention relates to improvements in the manufacture of concentrated lower aliphatic acids from their solutions and particularly their dilute solutions of whatever origin, and particularly to the manufacture of concentrated acetic acid from crude pyroligneous acid, from dilute acetic acid obtained as a by-product in the acetylation of cellulose, from fermentation acid, etc.

An object of the invention is to provide an economical process for extracting the lower aliphatic acids from relatively dilute solutions containing the same by means of an extracting medium. A further object of the invention is to provide a process for extracting the lower aliphatic acids from relatively dilute solutions of the same wherein the mixture of extractant and acid does not dissolve an excessive amount of water and wherein the acid left in the extracted mother liquor is negligible. Other objects of the invention will appear from the following detailed description.

It is known that acetic acid may be extracted from dilute aqueous solutions of the same with the aid of liquids which are insoluble or relatively insoluble in water. In extracting the acid the extractant and dilute acid solution are mixed together in any of a number of ways, the mixture of extractant and acid being separated from the aqueous solvent and then the acid and extractant being separated by distillation in a still equipped with a reflux column. When employing extractants commonly used prior to this invention, it is necessary to operate the process in such a manner that the mixture of extractant and acid going to the still contains less acid than the extractant is capable of carrying. If the acid concentration of the acid-extractant mixture exceeds a given amount the percentage of water dissolved in the mixture is increased beyond that point where the water and extractant can be azeotropically separated from the acid.

If the acidity of the extractant is increased, more water dissolves in the mixture of acid and extractant. There is then not sufficient extractant to remove this additional water by azeotropic distillation. This distillation process is unbalanced by this condition and operation is unsatisfactory, as the excess water carries acetic acid with it if removed by distillation. If the water is not removed, anhydrous acid is not recovered. It is then necessary to introduce additional acid-free extractant to the still to effect an azeotropic separation of the excess water. Adding this extractant means reducing the acid ratio of acid extracted to extractant employed. Thus, in the processes employed prior to this invention this balance of extractant, acid and water had to be carefully maintained for efficient operation. This balance naturally varies with the extractant employed and in many cases the critical range of the balance is very limited.

When employing N-propyl acetate as the extractant in accordance with this invention the acid concentration in the acid-extractant mixture may be from less than 1% to as high as 21% before any indication of an excess of dissolved water occurs. Therefore the necessary balance of extractant, acid and water covers a wide range. A further advantage of employing N-propyl acetate is that it has an exceptionally high water carrying power, i. e., it forms azeotropic mixtures with relatively large percentages of water as compared with other extractants. It has the further advantage of extracting substantially all the acid from the effluent water without dissolving excessive amounts of the water even after it has an acid concentration of about 21%.

In accordance with my invention, I extract aliphatic acids from aqueous solutions containing the same by means of an extractant comprising an aliphatic acid ester of an aliphatic alcohol wherein the ester contains at least five carbon atoms, a preferred example being N-propyl acetate. Other esters may be employed in place of all or a part of the N-propyl acetate for instance iso-propyl acetate, N-butyl acetate, etc. If desired, the extracting medium may contain besides the aliphatic acid ester of an aliphatic alcohol containing at least five carbon atoms, a compound which inhibits the hydrolysis of the ester under the conditions occurring in the extracting process.

Any suitable inhibitor against the hydrolysis of the ester employed in the extracting medium may be used. I have found very effective inhibitors to be sodium acetate, potassium acetate, sodium sulphate, potassium sulphate and like compounds. These inhibitors may be dissolved in water and added to the dilute aqueous solution of aliphatic acid entering the system or the inhibitors may be added to the extracting medium entering the system. It is obvious that if alkaline carbonates or bicarbonates are added they will be changed to the acetate or sulphate which, as stated above, are the desired inhibitors. The amount of alkaline salt employed as the inhibitors may vary from 0.05 to 2% of a concentrated aqueous solution of the same, the quantity being based on the amount of ester-extractant entering the system.

A trace or more of a sulphuric acid in the dilute solution from which the acid is to be concentrated increases the hydrolysis of the N-propyl acetate or other aliphatic acid ester of an aliphatic alcohol having at least five carbon atoms employed as the extractant. Therefore, if the dilute acetic acid contains any sulphuric acid, which is often the case when the dilute acid is received from processes involving the acetylation of cellulose, the sulphuric acid should be neutralized with sodium carbonate, sodium acetate or their equivalents prior to entering into the extracting system. As stated above, sodium sulphate is an excellent inhibitor against hydrolysis of the ester-extractant. Therefore, if a trace of sulphuric acid is present the same is neutralized by sodium carbonate or sodium acetate, forming sodium sulphate in situ due to the reaction with the sulphuric acid.

After extraction of the acid from the aqueous solution containing the same with the ester-extractant, the acid may be recovered from the extractant by fractional distillation or in any other suitable manner. The inhibitor for the most part will pass out of the system with the effluent water.

This invention is applicable to the separation of aliphatic acid from any aqueous solution of the same. By aliphatic acid is meant formic, acetic, butyric, propionic and other members of the series. This invention has been described with particular reference to the recovery of concentrated acetic acid from aqueous solutions of said acid derived from the pretreatment of cellulose and the acetylation of cellulose in the manufacture of cellulose acetate and products containing the same. It is understood, however, that the invention is not limited to dilute acid received from such a source. Other sources of the dilute acid may be the aqueous aliphatic acid solutions such as crude pyroligneous acid obtained by the destructive distillation of wood or other vegetable matter, liquors obtained from the fermentation of acid from apples, grapes or other vegetable matter, the destructive distillation of aliphatic acid salts, etc.

The extraction may be carried out in any known manner. It is preferably carried out, however, in a plant or device fully described in my U. S. application Ser. No. 747,083, filed October 5, 1934. In this device the extractant and the dilute aqueous acid enter at opposite ends of a column or series of columns and flow counter-current to each other. The columns, insofar as this invention is concerned, may be empty and a turbulent flow created or they may be partially or wholly filled with surface forming materials such as Raschig rings, broken stone or earthenware, beads or balls, deflector plates, etc. The stripped water is withdrawn from the system while the extractant containing the extracted acid is withdrawn from the system to a still or other separating system.

Other methods of carrying out the extraction may be employed. For instance, it may be carried out as a batch process wherein a dilute acid with the inhibitor and the extracting medium are introduced into a tank, thoroughly mixed and then permitted to separate into layers which are separately drawn off. For further efficiency, it is better to carry out the batch extraction in a series of tanks in a methodical manner, i. e. the first tank is fed with fresh extraction medium and dilute acid containing the inhibitor that has been subjected to a previous extraction treatment, while the last tank is fed with fresh dilute acid, the inhibitor and the extracting medium that has been used for former extractions and is therefore charged with acid.

Although this invention has been described particularly with reference to concentration of acetic acid, it is to be understood that it is not so limited and that it is applicable to the separation of any of the acids named above.

In order to further illustrate this invention without being limited thereby, the following example is given:

*Example*

To 100 parts by volume of aqueous acetic acid of 31% strength is mixed about one part by volume of a concentrated aqueous solution of sodium sulphate. This mixture is run countercurrent, through a series of columns partially filled with Raschig rings, to a stream of N-propyl acetate. To every 100 parts of the dilute acid there is employed about 147 parts N-propyl acetate. The temperature in the extracting column is maintained at about 25° C. The extracting medium with its extracted acid is passed to a still where the extracting medium with any dissolved water as an azeotropic mixture is separated from the acid leaving an hydrous acid of above 99% purity.

It is to be understood that the foregoing detailed description is given merely by way of illustration and that many variations may be made therein without departing from the spirit of my invention.

Having described my invention, what I desire to secure by Letters Patent is:

1. Process for the concentration of an aqueous solution of a lower aliphatic acid, which comprises extracting the acid from the aqueous solution with an extracting medium containing an aliphatic acid ester of an aliphatic alcohol, said ester containing at least five carbon atoms, in the presence of a small proportion of a salt of an alkali metal.

2. Process for the concentration of an aqueous solution of a lower aliphatic acid, which comprises extracting the acid from the aqueous solution with an extracting medium containing an aliphatic acid ester of an aliphatic alcohol, said ester containing at least five carbon atoms, in the presence of a small proportion of a concentrated aqueous solution of a salt of an alkali metal.

3. Process for the concentration of an aqueous solution of a lower aliphatic acid, which comprises extracting the acid from the aqueous solution with an extracting medium containing an aliphatic acid ester of an aliphatic alcohol, said ester containing at least five carbon atoms, in the presence of from 0.05 to 2% of a concentrated aqueous solution of a salt of an alkali metal.

4. Process for the concentration of an aqueous solution of acetic acid, which comprises extracting the acid from the aqueous solution with an extracting medium containing an aliphatic acid ester of an aliphatic alcohol, said ester containing at least five carbon atoms, in the presence of a small proportion of a salt of an alkali metal.

5. Process for the concentration of an aqueous solution of a fatty acid, which comprises extracting the acid from the aqueous solution with an extracting medium containing a propyl acetate, in the presence of a small proportion of a salt of an alkali metal.

6. Process for the concentration of an aqueous solution of a fatty acid, which comprises extracting the acid from the aqueous solution with an extracting medium containing N-propyl acetate, in the presence of a small proportion of a salt of an alkali metal.

7. Process for the concentration of an aqueous solution of acetic acid, which comprises mixing with an aqueous solution of acetic acid about 147 parts by volume of N-propyl acetate for every 100 parts by volume of acid and a small proportion of a salt of an alkali metal and separating the acid from the acid-extractant mixture.

HERBERT E. MARTIN.